(12) United States Patent
Mantravadi et al.

(10) Patent No.: US 7,701,917 B2
(45) Date of Patent: Apr. 20, 2010

(54) CHANNEL ESTIMATION FOR A WIRELESS COMMUNICATION SYSTEM WITH MULTIPLE PARALLEL DATA STREAMS

(75) Inventors: Ashok Mantravadi, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1141 days.

(21) Appl. No.: 10/773,646

(22) Filed: Feb. 5, 2004

(65) Prior Publication Data

US 2005/0176436 A1   Aug. 11, 2005

(51) Int. Cl.
  *H04J 1/00* (2006.01)
  *H04J 3/00* (2006.01)
  *H04B 7/212* (2006.01)
(52) U.S. Cl. .......................... 370/343; 370/345; 370/347
(58) Field of Classification Search ................. 370/286, 370/289, 290, 343, 347, 345
  See application file for complete search history.

(56) References Cited

U.S. PATENT DOCUMENTS

| | | | | |
|---|---|---|---|---|
| 5,995,567 | A * | 11/1999 | Cioffi et al. ................. | 375/346 |
| 6,181,714 | B1 * | 1/2001 | Isaksson et al. ............ | 370/491 |
| 6,327,315 | B1 | 12/2001 | Piirainen | |
| 7,155,165 | B1 * | 12/2006 | Kowalewki .................. | 455/65 |
| 7,215,713 | B2 * | 5/2007 | Walker et al. ............... | 375/261 |
| 7,418,026 | B2 | 8/2008 | Asjadi | |
| 2004/0121730 | A1 | 6/2004 | Kadous et al. | |

FOREIGN PATENT DOCUMENTS

| | | |
|---|---|---|
| EP | 1211819 A1 | 6/2002 |
| JP | 2001-352311 | 12/2001 |
| JP | 2002-043991 | 2/2002 |
| JP | 2003-304176 | 10/2003 |
| SE | 199603188 | 9/1996 |
| WO | 97040587 | 10/1997 |

(Continued)

OTHER PUBLICATIONS

Coleri, S. et al, "Channel Estimation Techniques Based on Pilot Arrangement in OFDM Systems" IEEE Transactions On Broadcasting, vol. 48, No. 3, Sep. 2002.

(Continued)

*Primary Examiner*—Eugene Yun
(74) *Attorney, Agent, or Firm*—Sandip Minhas; Gerald P. Joyce, III

(57) ABSTRACT

To recover multiple data streams transmitted simultaneously, a first channel estimate is derived for a wireless channel based on received pilot symbols. Detection is performed on received data symbols using the first channel estimate to obtain detected symbols for a first data stream. These detected symbols are decoded to obtain a decoded first data stream, which is re-encoded to obtain remodulated symbols. A second channel estimate is derived based on the remodulated symbols. The first and second channel estimates are combined to obtain a third channel estimate having higher quality. Interference due to the first data stream is estimated using the third channel estimate and canceled from the received data symbols. Detection is performed on interference-canceled symbols using the third channel estimate to obtain detected symbols for a second data stream. These detected symbols are further decoded to obtain a decoded second data stream.

36 Claims, 7 Drawing Sheets

FOREIGN PATENT DOCUMENTS

WO    9744916 A1    11/1997

OTHER PUBLICATIONS

Kaleong Lo et al., "Layered Space Time Coding with Joint Iterative Detection, Channel Estimation and Decoding," IEEE Seventh International Symposium on Spread-Spectrum Technology & Applications, vol. 2, pp. 308-312 (2002).

Paulraj A et al., "Introduction to Space-Time Wireless Communications," pp. 178-184, May 2003.

Zemen, T. et al., "Iterative Detection and Channel Estimation for MC-CDMA," IEEE International Conference on Communications, vol. 1 of 5, pp. 3462-3466, May 11, 2003.

Raleigh, G., G. et al., "Multivariate Modulation and Coding for Wireless Communication," IEEE Journal on Selected Areas in Communications, vol. 17, No. 5, pp. 851-866, May 1999.

Jie Zhu et al., "Channel Estimation with Power-Controlled Pilot Symbols and Decision-Directed Reference Symbols," IEEE Vehicular Technology Conference, vol. 2, pp. 1268-1272, Oct. 6, 2003.

Meyr H et al., "Digital Communication Receivers: Synchronization, Channel Estimation, and Signal Processing," Wiley-Interscience, New York, NY, pp. 649-650 (1998).

Li Y. et al: "Robust channel estimation for OFDM systems with rapid dispersive fading channels", IEEE Transactions on Communications, Jul. 1998, pp. 1-5.

Ling F: "Optimal reception, performance bound, and cutoff rate analysis of reference assisted coherent CDMA communications with applications". IEEE Transactions on Communications, vol. 47, No. 10, Oct. 1999, pp. 1-10.

International Search Report - PCT/US05/003156, International Search Authority - European Patent Office - Jun. 10, 2005.

Written Opinion - PCT/US05/003156, International Searching Authority - European Patent Office, Oct. 6 2005.

International Preliminary Report on Patentability - PCT/US05/003156, IPEA/US, May 9, 2007.

\* cited by examiner

CHANNEL ESTIMATION FOR A WIRELESS COMMUNICATION SYSTEM WITH MULTIPLE PARALLEL DATA STREAMS

BACKGROUND

I. Field

The present invention relates generally to communication, and more specifically to channel estimation for a wireless communication system that simultaneously transmits multiple data streams.

II. Background

A wireless communication system may provide voice, packet data, broadcast and/or other services. Broadcast service typically entails transmitting broadcast data to all users in a designated broadcast area instead of to specific users. Since a broadcast transmission is intended to be received by multiple users within the broadcast area, the broadcast data rate is normally determined by the user with the worst channel conditions. Typically, the worst-case user is located far away from a transmitting base station and has a low signal-to-noise-and-interference ratio (SINR).

The users in the broadcast area typically experience different channel conditions, achieve different SINRs, and are capable of receiving data at different data rates. Hierarchical transmission may be used to improve broadcast service. With hierarchical transmission, the broadcast data is divided into a "base stream" and an "enhancement stream". The base stream is transmitted in a manner such that all users in the broadcast area can recover this stream. The enhancement stream is transmitted in a manner such that users experiencing better channel conditions can recover this stream. Hierarchical transmission is also referred to as hierarchical coding, where the term "coding" in this context refers to channel coding rather than data coding at the transmitter.

In one method of implementing hierarchical coding, the base station processes (e.g., codes, interleaves, and modulates) the base stream and enhancement stream separately to obtain two data symbol streams. The base station then scales and combines (e.g., adds) the two data symbol streams and transmits the combined symbol stream. A receiver with a high SINR first detects and recovers the base stream by treating the enhancement stream as noise. The receiver then estimates and cancels the interference due to the base stream and thereafter recovers the enhancement stream with the interference from the base stream canceled. The receiver also estimates the response of the wireless channel and uses the channel estimate for three processing steps—to detect for the base stream, to estimate the interference due to the base stream, and to detect for the enhancement stream. The quality of the channel estimate directly impacts system performance. Thus, techniques that can provide a high quality channel estimate are highly desirable.

SUMMARY

Techniques for performing channel estimation and data processing in a wireless communication system that simultaneously transmits multiple data streams are described herein. These techniques may be used for various types of systems such as, for example, a hierarchical coded system that transmits two data streams—a base stream and an enhancement stream.

In one exemplary channel estimation and data processing scheme, a first (initial) channel estimate is derived for a wireless channel (e.g., based on received pilot symbols). The pilot symbols may be transmitted using a frequency division multiplex (FDM) transmission scheme, a time division multiplex (TDM) transmission scheme, or some other scheme. The first channel estimate may be derived using a least-squares channel estimation technique (described below) or some other technique. In any case, detection is performed on received data symbols using the first channel estimate to obtain detected symbols for a first data stream (e.g., the base stream). Each detected symbol is typically a multi-bit value (e.g., a "soft decision"), which may be real or complex, and may be represented in various forms (e.g., a log likelihood ratio (LLR)).

These detected symbols are decoded to obtain decoded data for the first data stream, which is re-encoded to obtain remodulated symbols. A second (data-directed or decision-directed) channel estimate is derived based on the remodulated symbols. The first and second channel estimates are then combined to obtain a third (enhanced) channel estimate having higher quality. Interference due to the first data stream is estimated using the third channel estimate and canceled from the received data symbols. Detection is then performed on interference-canceled symbols using the third channel estimate to obtain detected symbols for a second data stream (e.g., the enhancement stream), which are further decoded to obtain decoded data for the second data stream.

The third channel estimate obtained with the remodulated symbols for the first data stream has higher quality and can provide improved performance. In particular, the third channel estimate can provide (1) a more accurate estimate of the interference due to the first data stream and (2) higher quality detected symbols for the second data stream.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
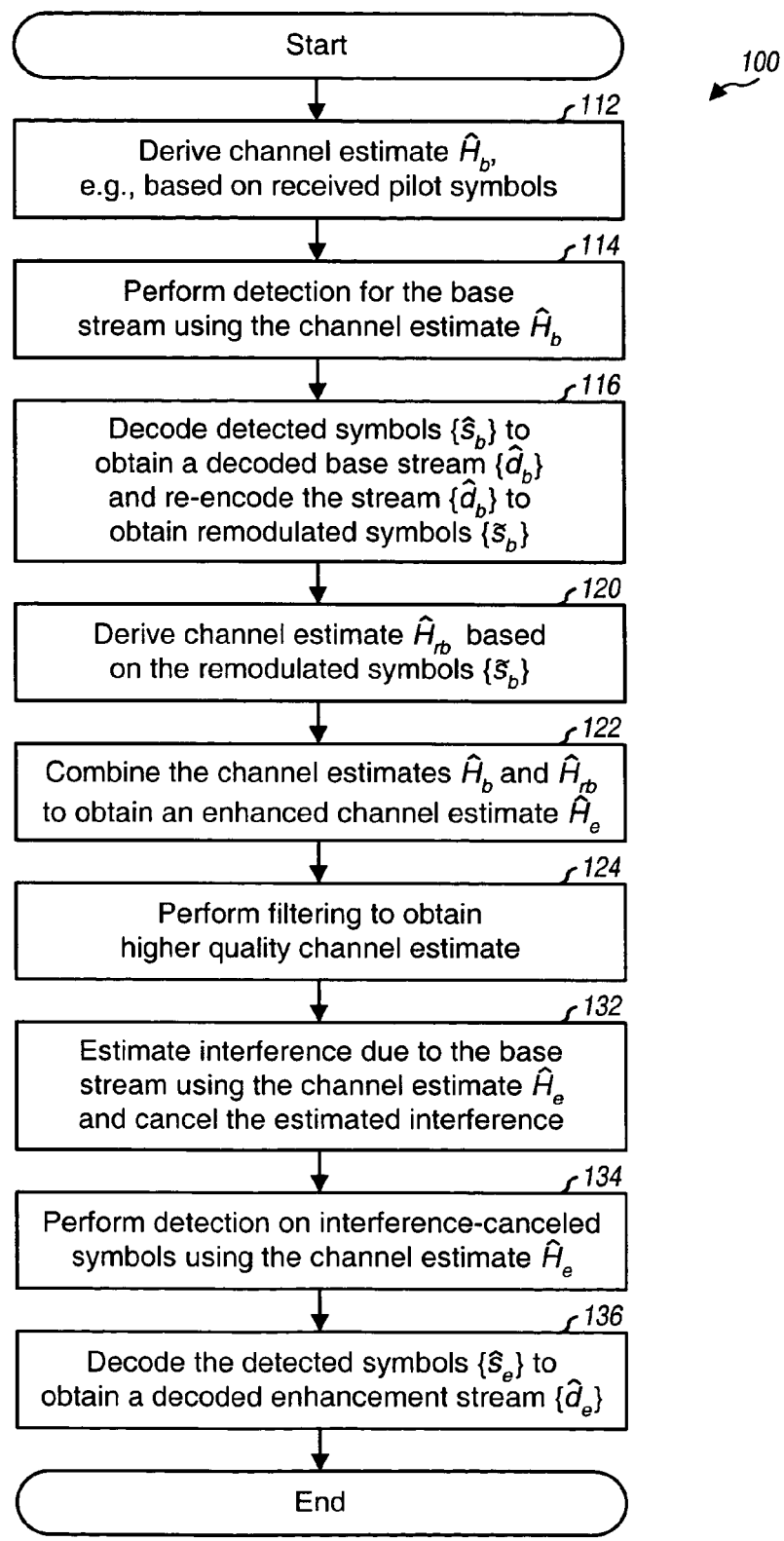
FIG. 1 shows a process for recovering the base stream and enhancement stream at a receiver in a hierarchical coded system.

The word "exemplary" is used herein to mean "serving as an example, instance, or illustration." Any embodiment or design described herein as "exemplary" is not necessarily to be construed as preferred or advantageous over other embodiments or designs.

The channel estimation and data processing techniques described herein may be used for various types of wireless communication systems, including single-carrier and multi-carrier communication systems. Multiple carriers may be obtained with orthogonal frequency division multiplexing (OFDM) or some other multi-carrier modulation techniques.

OFDM effectively partitions the overall system bandwidth into multiple (N) orthogonal subbands, which are also commonly referred to as tones, subcarriers, bins, and frequency channels. With OFDM, each subband is associated with a respective carrier that may be modulated with data. For clarity, the channel estimation and data processing techniques are specifically described below for an OFDM-based system, which may be an OFDM system, an orthogonal frequency division multiple access (OFDMA) system, and so on.

The channel estimation and data processing techniques may also be used for various wireless communication systems that transmit multiple data streams simultaneously (i.e., in parallel) and which may use interference cancellation to recover the transmitted data streams. For clarity, these techniques are specifically described for a system that uses hierarchical coding and transmits two data streams simultaneously.

In an OFDM-based system with hierarchical coding, a transmitter combines data symbols for the base stream with data symbols for the enhancement stream to obtain combined symbols. As used herein, a "data symbol" is a modulation symbol for data, and a "pilot symbol" is a modulation symbol for pilot and is known a priori by a receiver. The transmitter may combine the data symbols for the base stream and enhancement stream by (1) adding two data symbols for the two streams in each OFDM symbol period to obtain a combined symbol, (2) mapping the two data symbols based on a mapping function to obtain the combined symbol. For clarity, the following description assumes that the base stream and enhancement stream are added or superimposed. After combining, the transmitter processes and transmits the combined symbols over a wireless channel.

The received symbols at a receiver may be expressed as:

$$y_d(k) = H(k) \cdot [s_b(k) + s_e(k)] + N(k), \text{ for } k \in K_d, \quad \text{Eq (1)}$$

where $s_b(k)$ is a data symbol transmitted on subband k for the base stream;

$s_e(k)$ is a data symbol transmitted on subband k for the enhancement stream;

H(k) is a complex channel gain for subband k;

N(k) is the noise and interference observed on subband k;

$y_d(k)$ is a received data symbol for subband k; and $K_d$ is a set of all subbands used for data transmission (i.e., the "data subbands").

For simplicity, the processing at the transmitter and receiver for OFDM is omitted from the description.

In general, same or different transmit powers may be used for the base stream and enhancement stream. For simplicity, equation (1) assumes that the same transmit power is used for the two streams. Alternatively, the data symbols $s_b(k)$ and $s_e(k)$ may be assumed to include the effect of the power allocations for the two data streams.

FIG. 1 shows a flow diagram of a process 100 for recovering the base stream and enhancement stream at the receiver. The receiver first derives a channel estimate $\hat{H}_b$ for the data subbands, for example, based on pilot symbols received along with the combined symbols by the receiver (block 112). The channel estimate $\hat{H}_b$ may be obtained as described below.

The receiver performs detection for the base stream using the channel estimate $\hat{H}_b$ (block 114). In one embodiment, the detection is performed as follows:

$$\hat{s}_b(k) = \frac{y_d(k)}{\hat{H}_b(k)} \approx s_b(k) + s_e(k) + N_b(k), \text{ for } k \in K_d, \quad \text{Eq (2)}$$

where $\hat{H}_b(k)$ is a channel gain estimate for subband k;

$\hat{s}_b(k)$ is a detected symbol for subband k for the base stream; and $N_b(k)$ is the post-processed noise on subband k for the base stream.

Equation (2) indicates that the data symbols $s_b(k)$ and $s_e(k)$ transmitted on subband k may be recovered by dividing the received data symbol $y_d(k)$ for subband k by the channel gain estimate $\hat{H}_b(k)$ for subband k. This operation is commonly referred to as equalization and is typically used for an uncoded system. In another embodiment, the detection is performed as follows:

$$\hat{s}_b(k) = y_d(k)\hat{H}_b^*(k) = \hat{H}_b^*(k)H_b(k) \cdot [s_b(k) + s_e(k)] + N'_b(k),$$
$$\text{for } k \in K_d, \quad \text{Eq (3)}$$

where "*" denotes the complex conjugate. The operation in equation (3) is commonly referred to as matched filtering and is typically used for a coded system.

After the detection, the receiver "decodes" the detected symbols $\{\hat{s}_b\}$ for the base stream to obtain a decoded base stream $\{\hat{d}_b\}$, which is an estimate of the transmitted base stream $\{d_b\}$ (block 116). The decoding typically includes demodulation (e.g., symbol demapping or log-likelihood ratio (LLR) computation), deinterleaving, error correction decoding (e.g., block, Viterbi, and/or Turbo decoding), and error detection decoding (e.g., cycle redundancy check (CRC) decoding). As shown in equations (2) and (3), the detected symbols $\{\hat{s}_b\}$ include both the data symbols $\{s_b\}$ for the base stream and the data symbols $\{s_e\}$ for the enhancement stream, which are treated as noise in the decoding of the base stream. The receiver further "re-encodes" the decoded base stream $\{\hat{d}_b\}$ to obtain remodulated symbols $\{\tilde{s}_b\}$, which are estimates of the transmitted data symbols $\{s_b\}$ for the base stream (also block 116). The re-encoding typically includes coding, interleaving, and modulation (i.e., symbol mapping).

If the base stream is decoded correctly, then the receiver derives a data-directed channel estimate $\hat{H}_{rb}$ for the data subbands based on the received data symbols and the remodulated symbols (block 120). As an example, the data-directed channel estimate $\hat{H}_{rb}$ may be derived as follows:

$$\hat{H}_{rb}(k) = \frac{y_d(k)}{\tilde{s}_b(k)} \text{ or } \hat{H}_{rb}(k) = y_d(k)\tilde{s}_b^*(k), \text{ for } k \in K_d, \quad \text{Eq (4)}$$

where $\hat{H}_{rb}(k)$ is a channel gain estimate for subband k obtained based on the remodulated symbol $\{\tilde{s}_b\}$ for the base stream. The two operations shown in equation (4) are not equivalent for some modulation schemes (e.g., 16-QAM). The channel estimate $\hat{H}_{rb}$ may also be derived in other manners, as described below.

Whether or not the base stream is decoded correctly may be determined based on an error detection code such as a CRC code. If the base stream is decoded correctly, then the remodulated symbols for the base stream may be considered to be free of errors and may be used in similar manner as pilot symbols for channel estimation. However, since the received data symbols $\{y_d\}$ include the data symbols $\{s_b\}$ and $\{s_e\}$ for both streams, as shown in equations (2) and (3), the channel estimate $\hat{H}_{rb}$ includes noise/interference from the data symbols $\{s_e\}$ for the enhancement stream. For hierarchical coding, the transmit power used for the enhancement stream may be a small portion (e.g. ¼, ¹⁄₁₀, or ¹⁄₂₀) of the transmit power used for the base stream. In this case, the noise/interference due to the enhancement stream may be small. Regardless, the channel estimate $\hat{H}_{rb}$ can typically provide additional useful information for the wireless channel response.

The receiver next combines the initial channel estimate $\hat{H}_b$ with the data-directed channel estimate $\hat{H}_{rb}$ to obtain an enhanced channel estimate $\hat{H}_e$ (block 122). The decoded base stream is thus used to obtain a decision directed update of the channel estimate. The combining may be performed in various manners, which may trade off performance for complexity. In one embodiment, the channel estimates are combined as follows:

$$\hat{H}_e(k) = \alpha_h \cdot \hat{H}_b(k) + (1-\alpha_h) \cdot \hat{H}_{rb}(k), \text{ for } k \in K_d, \quad \text{Eq (5)}$$

where $\alpha_h$ is a value that is selected based on the relative reliability of the two channel estimates $\hat{H}_b$ and $\hat{H}_{rb}$. The reliability of $\hat{H}_b$ may be dependent on various factors such as the transmit power used for the pilot symbols, the number of pilot subbands, the filtering used to obtain $\hat{H}_b$, and so on. The reliability of $\hat{H}_{rb}$ may also be dependent on various factors such as the relative power between the base stream and enhancement stream, the channel conditions, and so on. Various measures of reliability may be used for the channel estimates such as, for example, mean square errors of the channel estimates. A larger $\alpha_h$ value gives more weight to the channel estimate $\hat{H}_b$, which may be desirable if $\hat{H}_{rb}$ is deemed to be less reliable than $\hat{H}_b$. Conversely, a smaller $\alpha_h$ value gives more weight to the channel estimate $\hat{H}_{rb}$. The $\alpha_h$ value may be fixed or dynamic (e.g., computed for each data packet). The combining of the channel estimates $\hat{H}_b$ and $\hat{H}_{rb}$ may also be performed in the time domain or the frequency domain.

The receiver may perform filtering to obtain a higher quality channel estimate (block 124). The filtering may be performed in various manners and using various types of filters. For example, the receiver can filter the channel estimate $\hat{H}_b$ and/or the channel estimate $\hat{H}_{rb}$ over multiple OFDM symbol periods prior to combining the two channel estimates. As another example, the receiver can filter the enhanced channel estimate $\hat{H}_e$ over multiple OFDM symbol periods after the combining. As yet another example, the receiver can filter the channel estimates $\hat{H}_b$, $\hat{H}_{rb}$ and $\hat{H}_e$. The receiver may perform the filtering (1) in the time domain or the frequency domain and (2) using various types of filters such as an infinite impulse response (IIR) filter, a finite impulse response (FIR) filter, and so on. Filtering with IIR and FIR filters is described below.

The receiver next derives an estimate of the interference due to the base stream using the enhanced channel estimate $\hat{H}_e$ (block 132), as follows:

$$i_b(k) = \hat{H}_e(k) \cdot \tilde{s}_b(k), \text{ for } k \in K_d, \quad \text{Eq (6)}$$

where $i_b(k)$ is the estimated interference on subband k due to the base stream. The receiver then cancels the estimated interference from the received data symbols (also block 132), as follows:

$$y_e(k) = y_d(k) - i_b(k), \text{ for } k \in K_d, \quad \text{Eq (7)}$$

where $y_e(k)$ is an interference-canceled symbol for subband k, which has the estimated interference from the base stream removed. The receiver may perform the interference estimation and cancellation (1) only if the base stream has been decoded correctly, (2) only if the quality of the decoded base stream, as quantified by one or more decoding metrics, exceeds a predetermined threshold, or (3) all the time, regardless of the outcome of the decoding.

The receiver then performs detection for the enhancement stream using the enhanced channel estimate $\hat{H}_e$ (block 134). The detection may be performed as follows:

$$\hat{s}_e(k) = \frac{y_e(k)}{\hat{H}_e(k)} \approx s_e(k) + N_e(k), \text{ for } k \in K_d, \quad \text{Eq (8)}$$

where $\hat{s}_e(k)$ is a detected symbol on subband k; and
$N_e(k)$ is the post-processed noise on subband k for the enhancement stream.

Alternatively, the detection may be performed as:

$$\hat{s}_e(k) = y_e(k) \hat{H}_e^*(k) \approx s_e(k) + N'_e(k), \text{ for } k \in K_d. \quad \text{Eq (9)}$$

In any case, the receiver decodes the detected symbols $\{\hat{s}_e\}$ to obtain a decoded enhancement stream $\{\hat{d}_e\}$, which is an estimate of the transmitted enhancement stream $\{d_e\}$ (block 136).

FIG. 1 shows channel estimation and data processing for an OFDM-based system with hierarchical coding where two superimposed data streams are transmitted simultaneously. In general, similar processing may be performed for other types of systems and on any number of data streams.

Figure 2:
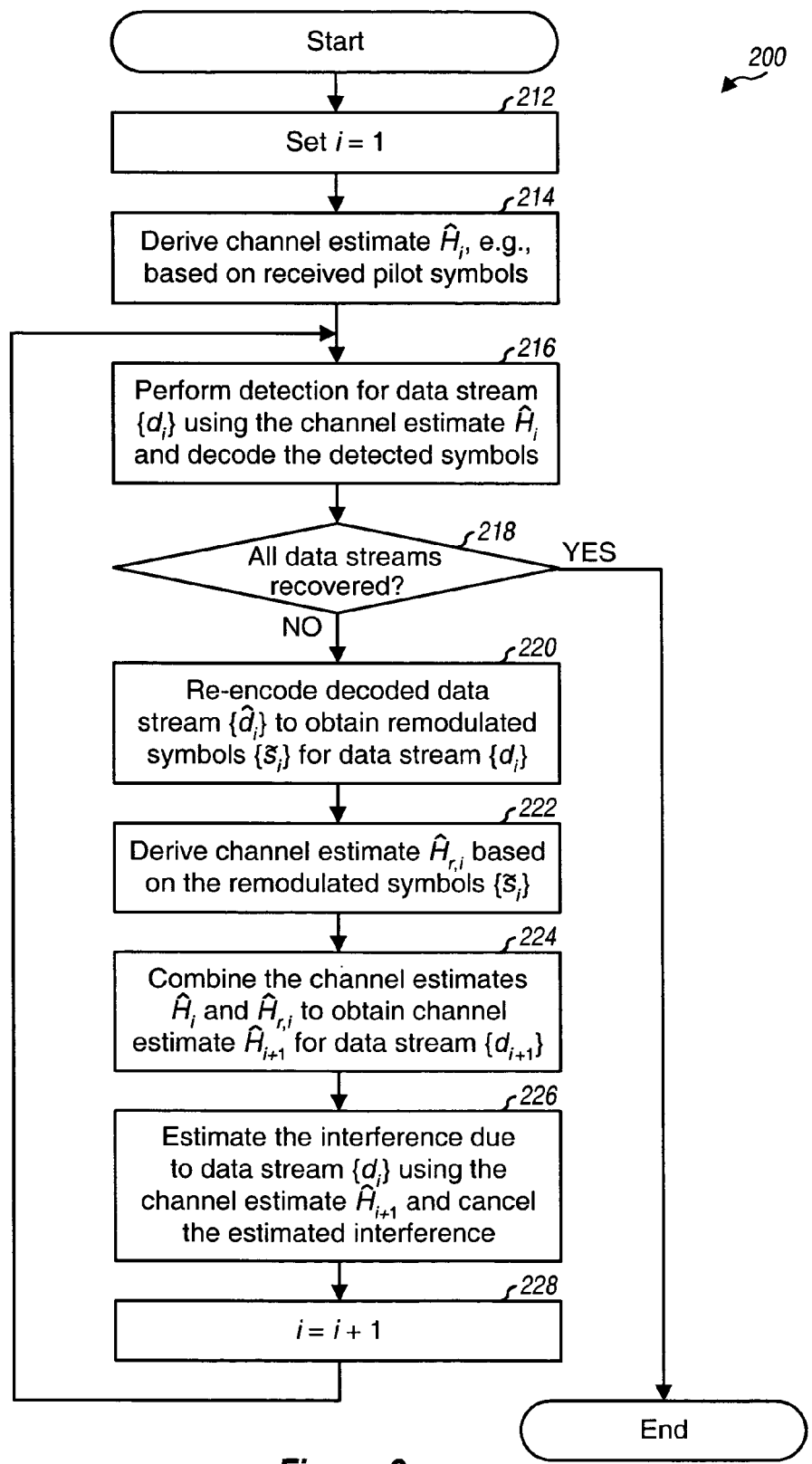
FIG. 2 shows a process for performing channel estimation and data processing for multiple data streams transmitted simultaneously.

FIG. 2 shows a flow diagram of a process 200 for performing channel estimation and data processing for multiple data streams transmitted simultaneously. Process 200 iteratively recovers one data stream in each stage and updates the channel estimate as each data stream is recovered.

An index i used to denote the stage number and the data stream to be recovered next is initialized to 1 (i.e., i=1) for the first stage (block 212). A channel estimate $\hat{H}_i$ for the first data stream is derived, for example, based on received pilot symbols (block 214).

For stage i, detection is performed on input symbols $\{y_i\}$ using the channel estimate $\hat{H}_i$ to obtain detected symbols $\{\hat{s}_i\}$ for data stream $\{d_i\}$ (block 216). For the first stage, the input symbols $\{y_i\}$ are the received data symbols $\{y_d\}$. For each subsequent stage, the input symbols $\{y_i\}$ are interference-canceled symbols from the preceding stage i−1. The detected symbols $\{\hat{s}_i\}$ are decoded to obtain a decoded data stream $\{\hat{d}_i\}$ (also block 216).

A determination is then made whether or not all data streams have been recovered (block 218). If the answer is 'yes', then the process terminates. Otherwise, the decoded data stream $\{\hat{d}_i\}$ is re-encoded to obtain remodulated symbols $\{\tilde{s}_i\}$ for data stream $\{d_i\}$ (block 220). If the data stream $\{d_i\}$ is decoded correctly, then the remodulated symbols $\{\tilde{s}_i\}$ are used to derive a data-directed channel estimate $\hat{H}_{r,i}$ (block 222). The channel estimates $\hat{H}_i$ and $\hat{H}_{r,i}$ are then combined (e.g., as shown in equation (5)) to obtain an enhanced channel estimate $\hat{H}_{i+1}$ for the next stage (block 224). The interference due to data stream $\{d_i\}$ is estimated using the channel estimate $\hat{H}_{i+1}$ and canceled from the input symbols $\{y_i\}$ for stage i to obtain input symbols $\{y_{i+1}\}$ for the next stage (block 226). The index i is incremented (block 228), and the process then returns to block 216 to recover the next data stream.

The enhanced channel estimate obtained with remodulated symbols from a decoded data stream can provide improved overall performance. The enhanced channel estimate can be used to obtain a more accurate estimate of the interference due to the decoded data stream since the remodulated symbols are multiplied by the channel estimate, as shown in equation (6). The enhanced channel estimate can also be used to obtain higher quality detected symbols for the next data stream to be decoded since the received data symbols are divided by or multiplied with the channel estimate for the detection, as show in equations (8) and (9). The improved channel estimate for stage i may be used to perform interference cancellation for stage i (as described above). The improved channel estimate for stage i may also be used to perform interference cancellation for all stages up to and including stage i, i.e., stages 1 through i, (not shown in FIG. 2 for simplicity.).

The channel estimation and data processing techniques described herein may be used in conjunction with various pilot transmission schemes. For a TDM pilot transmission scheme, pilot symbols are transmitted on all subbands in some of the OFDM symbol periods and data symbols are transmitted in the remaining OFDM symbol periods. For an FDM pilot transmission scheme, pilot symbols are transmitted in each OFDM symbol period but only on subbands designated for pilot transmission (i.e., "pilot subbands"). Pilot symbols may also be transmitted in other manners, and this is within the scope of the invention.

Figure 3A:
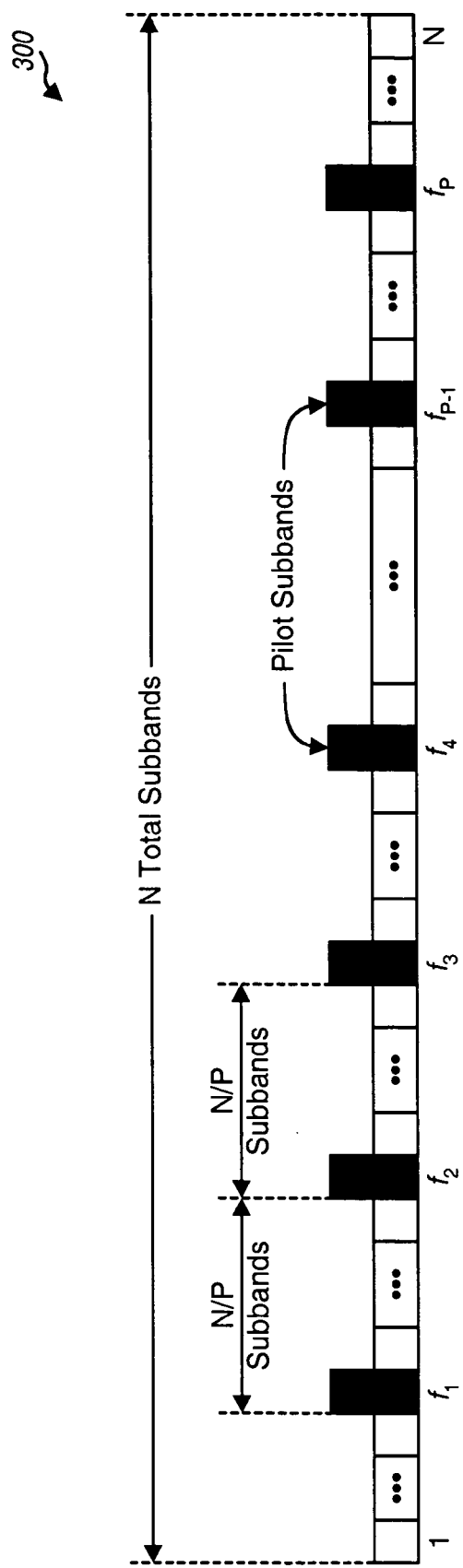
FIGS. 3A and 3B show exemplary FDM and TDM pilot transmission schemes, respectively, for an OFDM system.

FIG. 3A shows an exemplary subband structure that may be used for an OFDM-based system. The OFDM-based system has an overall system bandwidth of BW MHz, which is partitioned into N orthogonal subbands using OFDM. Each subband has a bandwidth of BW/N MHz. In a spectrally shaped OFDM system, only M of the N total subbands are used for data/pilot transmission, where M<N, and the remaining N−M subbands are not used for data/pilot transmission and serve as guard subbands to allow the system to meet spectral mask requirements. For simplicity, the following description assumes that all N subbands may be used for data/pilot transmission.

FIG. 3A also shows an exemplary FDM pilot transmission scheme 300 for the OFDM system. P subbands are used for pilot transmission. To simplify computation for the channel estimate, the P pilot subbands may be uniformly distributed across the N total subbands such that consecutive pilot subbands are spaced apart by N/P subbands.

For block 112 in FIG. 1 and block 214 in FIG. 2, the receiver can derive an initial frequency response estimate $\hat{H}_p$ of the wireless channel based on the received pilot symbols, as follows:

$$\hat{H}_p(k) = \frac{y_p(k)}{p(k)}, \text{ for } k \in K_p, \quad \text{Eq (10)}$$

where $y_p(k)$ is a received pilot symbol for subband k;
p(k) is a pilot symbol transmitted on subband k;
$\hat{H}_p(k)$ is a channel gain estimate for pilot subband k; and
$K_p$ is a set of all pilot subbands.

A P×1 vector $\underline{\hat{H}}_p$ for the initial frequency response estimate for P uniformly spaced pilot subbands may be formed as $\underline{\hat{H}}_p = [\hat{H}_p(1) \hat{H}_p(2) \ldots \hat{H}_p(P)]^T$, where "T" denotes the transpose. Extrapolation and/or interpolation may be used, as necessary, to obtain channel gain estimates for pilot subbands without pilot transmission based on the received pilot symbols for the pilot subbands with pilot transmission.

A N×1 vector $\underline{\hat{H}}_b$ for the frequency response estimate for the N total subbands may be obtained based on the frequency response estimate $\underline{\hat{H}}_p$ using various techniques. For a least-squares channel estimation technique, a least-squares impulse response estimate for the wireless channel is first obtained, as follows:

$$\underline{\hat{h}}_{ls} = \underline{W}_{P \times P}^H \underline{\hat{H}}_p, \quad \text{Eq (11)}$$

where $\underline{\hat{h}}_{ls}$ is a P×1 vector for the least-squares impulse response estimate;
$\underline{W}_{P \times P}$ is a P×P DFT matrix used to perform a discrete Fourier transform (DFT) on $\underline{\hat{H}}_p$ to obtain $\underline{\hat{h}}_{ls}$; and
"H" denotes the conjugate transpose.

The DFT matrix $\underline{W}_{P \times P}$ is defined such that the (n,m)-th entry $w_{n,m}$ is given as:

$$w_{n,m} = e^{-j2\pi \frac{(n-1)(m-1)}{P}}, \text{ for } n = \{1 \ldots P\} \text{ and } m = \{1 \ldots P\}, \quad \text{Eq (12)}$$

where n is a row index and m is a column index.

Equation (11) indicates that the impulse response estimate $\underline{\hat{h}}_{ls}$ can be obtained by performing a P-point IFFT on the initial frequency response estimate $\underline{\hat{H}}_p$. The vector $\underline{\hat{h}}_{ls}$ can be post-processed, for example, by (1) setting entries with low values less than a predetermined threshold to zero and/or (2) setting the L-th through P-th entries in the vector to zero, where L is the expected delay spread of the system. The vector $\underline{\hat{h}}_{ls}$ is next zero-padded to length N. The zero-padded vector $\underline{\hat{h}}_{ls,N}$ is then transformed with an N-point FFT to obtain the vector $\underline{\hat{H}}_b$, as follows:

$$\underline{\hat{H}}_b = \underline{W}_{N \times N} \underline{\hat{h}}_{ls,N}, \quad \text{Eq (13)}$$

where $\underline{\hat{H}}_b = [\hat{H}_b(1) \hat{H}_b(2) \ldots \hat{H}_b(N)]^T$.

The initial frequency response estimate $\underline{\hat{H}}_p$, the impulse response estimate $\underline{\hat{h}}_{ls}$, and/or the frequency response estimate $\underline{\hat{H}}_b$ may be filtered to obtain higher quality. For example, the initial frequency response estimate $\underline{\hat{H}}_p$ may be filtered with an IIR filter, as follows:

$$\underline{\tilde{H}}_p(n) = (1-\alpha_t) \cdot \underline{\tilde{H}}_p(n-1) + \alpha_t \cdot \underline{\hat{H}}_p(n), \quad \text{Eq (14)}$$

where $\underline{\hat{H}}_p(n)$ is the frequency response estimate obtained for OFDM symbol period n;
$\underline{\tilde{H}}_p(n)$ is the filtered frequency response estimate for OFDM symbol period n; and
$\alpha_t$ is a time constant for the filtering.

The time constant $\alpha_t$ may be selected to provide good performance for a range of Doppler frequencies. The filtered frequency response estimate $\underline{\tilde{H}}_p(n)$ is then used to derive the impulse response estimate $\underline{\hat{h}}_{ls}$ in equation (11).

As another example, the initial frequency response estimate $\underline{\hat{H}}_p$ may be filtered with a FIR filter, as follows:

$$\tilde{H}_p(n) = \sum_{i=-L_1}^{L_2} c_i \cdot \hat{H}_p(n-i), \quad \text{Eq (15)}$$

where $c_i$ is the filter coefficient for tap i of the FIR filter and $L_1$ and $L_2$ are the extent of the FIR filter. For a causal FIR filter, $L_1 = 0$, $L_2 \geq 1$, and the filtered frequency response estimate $\underline{\tilde{H}}_p(n)$ is a weighted sum of the frequency response estimates $\underline{\hat{H}}_p(n)$ for $L_2$ prior and the current OFDM symbol periods. For a non-causal FIR filter, $L_1 \geq 1$, $L_2 \geq 1$, and the filtered frequency response estimate $\underline{\tilde{H}}_p(n)$ is a weighted sum of the frequency response estimates $\hat{\underline{H}}_p(n)$ for $L_2$ prior, the current, and $L_1$ future OFDM symbol periods. Buffering of $L_1$ received OFDM symbols is needed to implement the non-causal FIR filter. The impulse response estimate $\hat{\underline{h}}_{ls}$ and/or the frequency response estimate $\hat{\underline{H}}_b$ may also be filtered, for example, as shown in equations (14) and (15).

The derivation of the channel frequency response estimate $\hat{\underline{H}}_b$ based on received pilot symbols for pilot subbands is described in detail in commonly assigned U.S. patent application Ser. No. 10/741,524, entitled "Channel Estimation for an OFDM Communication System with Inactive Subbands," filed Dec. 19, 2003. The vector $\hat{\underline{H}}_b$ may also be derived in other manners, such as with a minimum mean square error (MMSE) technique.

For block 120 in FIG. 1 and block 222 in FIG. 2, the data-directed channel estimates $\hat{H}_{r,b}$ and $\hat{H}_{r,i}$ are derived based on the remodulated symbols for a decoded data stream, for example, as shown in equation (4). The remodulated symbols may be viewed as "new" pilot symbols that can be used to improve the channel estimates for the next stream to be detected. The channel estimates $\hat{H}_b$ or $\hat{H}_i$ used for the current stream may be combined with the data-directed channel estimates $\hat{H}_{r,b}$ or $\hat{H}_{r,i}$ to obtain the channel estimates $\hat{H}_e$ or $\hat{H}_{i+1}$ for the next stream, which may be further improved using interpolation techniques. The combining and interpolation may be performed in various manners. For clarity, the description below is for the hierarchical coded system with only the base stream and enhancement stream.

In one embodiment, the channel gain estimates obtained with the initial and new pilot symbols are concatenated/combined and used to derive the channel estimates for the next stream. For example, if pilot is transmitted on P pilot subbands and data is transmitted on the remaining N-P subbands, then the remodulated symbols derived from the decoded base stream for the N-P data subbands may be used as new pilot symbols for these subbands. A revised initial frequency response estimate $\hat{\underline{H}}_{p,b}$ for all N subbands may be obtained, for example, by concatenating (1) the P channel gain estimates in $\hat{\underline{H}}_p$ for the P pilot subbands with (2) N-P channel gain estimates obtained from the N-P new pilot symbols for the N-P data subbands. The revised initial frequency response estimate $\hat{\underline{H}}_{p,b}$ may then be used to derive an enhanced frequency response estimate $\hat{\underline{H}}_e$ through any frequency interpolation algorithm. For example, using the least-squares criterion, an enhanced impulse response estimate can be obtained first as follows:

$$\hat{\underline{h}}_{ls,p,b} = (\underline{W}_{N\times P}^H \cdot \underline{W}_{N\times P})^{-1} \cdot \underline{W}_{N\times P}^H \cdot \hat{\underline{H}}_{p,b}, \quad \text{Eq (16)}$$

where $\underline{W}_{N\times P}$ is a N×P submatrix of the N×N DFT matrix, formed by taking the first P columns of $\underline{W}_{N\times N}$. The enhanced frequency response estimate $\hat{\underline{H}}_e$ can then be derived by (1) thresholding and truncating (which are optional) and zero-padding the impulse response estimate $\hat{\underline{h}}_{ls,p,b}$ and (2) performing an N-point FFT on the zero-padded impulse response estimate. The enhanced frequency response estimate $\hat{\underline{H}}_e$ is then used to detect the enhancement stream.

In another embodiment, interpolation is used and combining is performed in the frequency domain. The least-squares channel estimation technique may be used to derive a data-directed least-squares impulse response estimate $\hat{\underline{h}}_{ls,p,b}$ (e.g., with P taps) based on the new pilot symbols for the N-P data subbands, as follows:

$$\hat{\underline{h}}_{ls,r,b} = (\underline{W}_{(N-P)\times P}^H \cdot \underline{W}_{(N-P)\times P})^{-1} \cdot \underline{W}_{(N-P)\times P}^H \cdot \hat{\underline{H}}_{r,b}, \quad \text{Eq (17)}$$

where $\underline{W}_{(N-P)\times P}$ is a (N-P)×P submatrix of the N×N DFT matrix, formed by taking the first P columns and the N-P rows of $\underline{W}_{N\times N}$ that correspond to the data subbands. A data-directed frequency response estimate $\hat{\underline{H}}_{r,b}$ may be obtained by thresholding and truncation, zero-padding, and performing an N-point FFT on the zero-padded impulse response estimate. The data-directed frequency response estimate $\hat{\underline{H}}_{r,b}$ may then be combined with the frequency response estimate $\hat{\underline{H}}_b$, which is derived based on the pilot symbols, to obtain the enhanced frequency response estimate $\hat{\underline{H}}_e$ for the enhancement stream. The combining of $\hat{\underline{H}}_{r,b}$ with $\hat{\underline{H}}_b$ may be performed as shown in equation (5).

In yet another embodiment, interpolation is used and combining is performed in the time domain. The least-squares impulse response estimate $\hat{\underline{h}}_{ls}$ for the base stream and the data-directed least-squares impulse response estimate $\hat{\underline{h}}_{ls,r,b}$ may be combined (e.g., as shown in equation (5)), thresholded and truncated, zero-padded, and transformed to obtain the enhanced frequency response estimate $\hat{\underline{H}}_e$. For all embodiments described above, an "oversampling" gain may be achieved for the estimates $\hat{\underline{h}}_{ls,r,b}$ and $\hat{H}_{r,b}$ since N-P may be much greater than P.

Figure 3B:
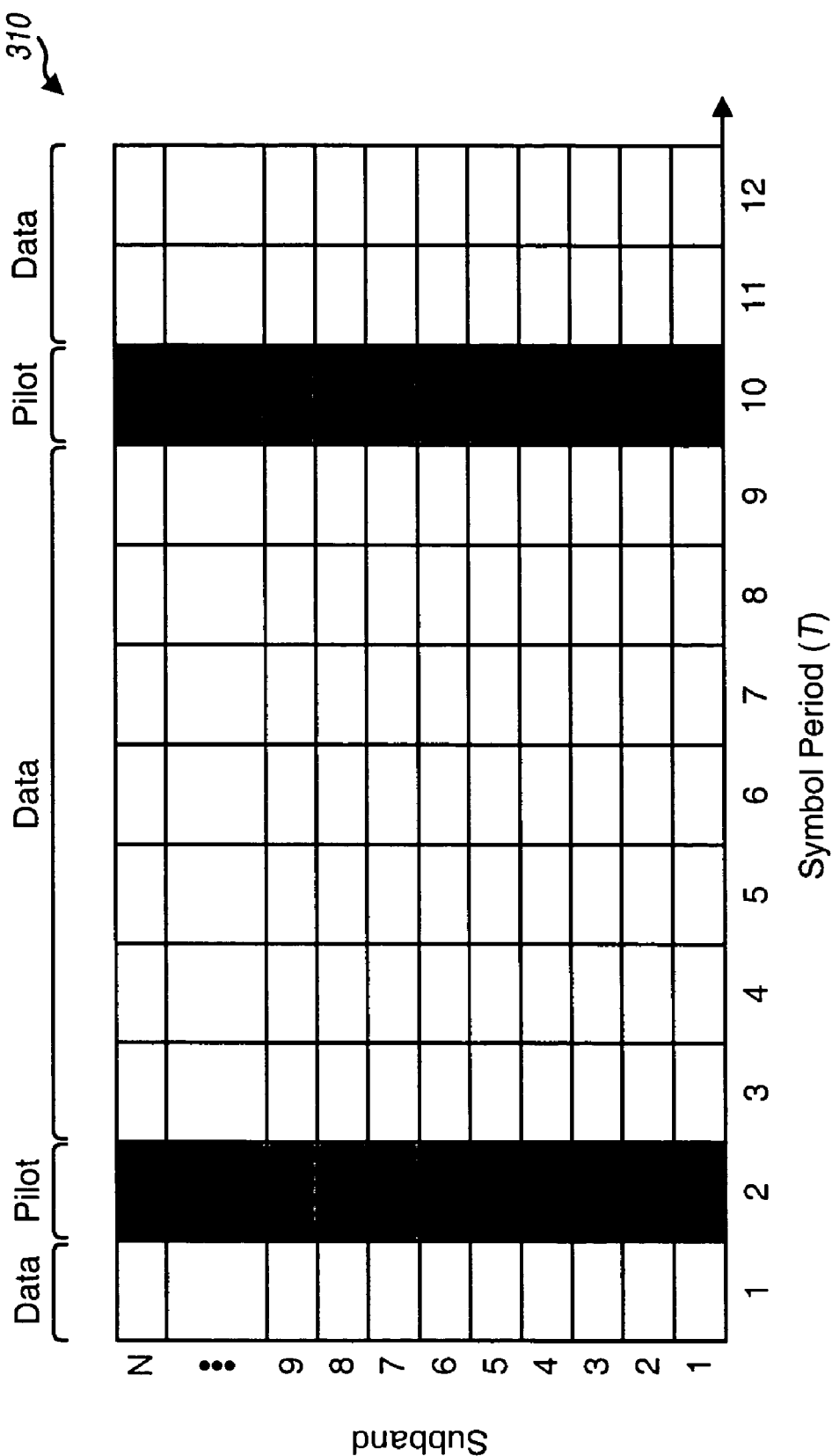

FIG. 3B shows an exemplary TDM pilot transmission scheme 310 for the OFDM system. Pilot symbols are transmitted on all subbands in OFDM symbol periods used for pilot transmission (or simply, "pilot periods"). No pilot symbols are transmitted in OFDM symbol periods used for data transmission (or simply, "data periods").

The receiver can derive the channel estimate $\hat{H}_b$ based on received pilot symbols obtained during pilot periods. The receiver can derive the channel estimate $\hat{H}_{r,b}$ based on remodulated symbols obtained during data periods. The receiver can combine the channel estimates $\hat{H}_b$ and $\hat{H}_{r,b}$ to obtain the enhanced channel estimate $\hat{H}_e$, which can be used for interference estimation in the current data period and data detection in a future data period. The channel estimate $\hat{H}_e$ can be derived and updated in conjunction with interpolation and other techniques normally used for a TDM pilot transmission scheme.

For clarity, the channel estimation and data processing are described in detail below for an exemplary OFDM-based system with hierarchical coding.

Figure 4:
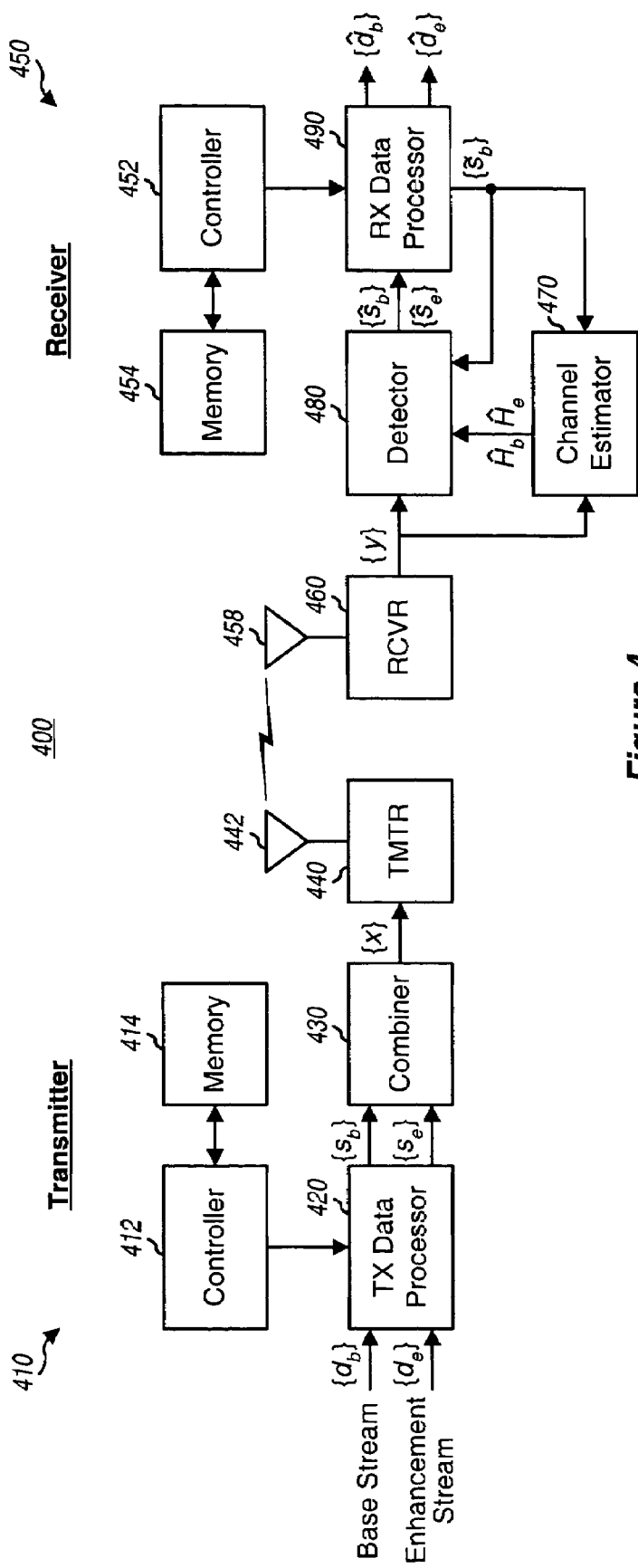
FIG. 4 shows a transmitter and a receiver in an OFDM-based system.

FIG. 4 shows a block diagram of a transmitter 410 and a receiver 450 in an OFDM-based system 400. At transmitter 410, a transmit (TX) data processor 420 receives, codes, interleaves, and modulates a base stream $\{d_b\}$ and provides a corresponding data symbol stream $\{s_b\}$. TX data processor 420 also receives, codes, interleaves, and modulates an enhancement stream $\{d_e\}$ and provides a corresponding data symbol stream $\{s_e\}$. A combiner 430 scales and combines the two data symbol streams $\{s_b\}$ and $\{s_e\}$, multiplexes in pilot symbols, and provides a transmit symbol stream $\{x\}$. A transmitter unit (TMTR) 440 receives and processes the transmit symbol stream and generates a modulated signal, which is transmitted from an antenna 442 and via a wireless channel.

At receiver 450, an antenna 458 receives the modulated signal transmitted by transmitter 410 and provides a received signal to a receiver unit (RCVR) 460. Receiver unit 460 conditions, digitizes, and processes the received signal and provides a received symbol stream $\{y\}$, which includes received data symbols $\{y_d\}$ and received pilot symbols $\{y_p\}$. A channel estimator 470 derives (1) the channel estimate $\hat{H}_b$ used for detecting the base stream and (2) the enhanced channel estimate $\hat{H}_e$ used for estimating the interference due to the base stream and for detecting the enhancement stream. A detector 480 performs detection to obtain a detected symbol stream $\{\hat{s}_b\}$ for the base stream, estimates the interference due to the base stream, and performs detection to obtain a detected symbol stream $\{\hat{s}_e\}$ for the enhancement stream.

A receive (RX) data processor 490 demodulates, deinterleaves, and decodes the detected symbol stream $\{\hat{s}_b\}$ to obtain a decoded base stream $\{\hat{d}_b\}$. RX data processor 490 also demodulates, deinterleaves, and decodes the detected symbol stream $\{\hat{s}_e\}$ to obtain a decoded enhancement stream $\{\hat{d}_e\}$. The processing units at transmitter 410 and receiver 450 are described in further detail below.

Controllers 412 and 452 direct the operation at transmitter 410 and receiver 450, respectively. Memory units 414 and 454 provide storage for program codes and data used by controllers 412 and 452, respectively.

Figure 5:
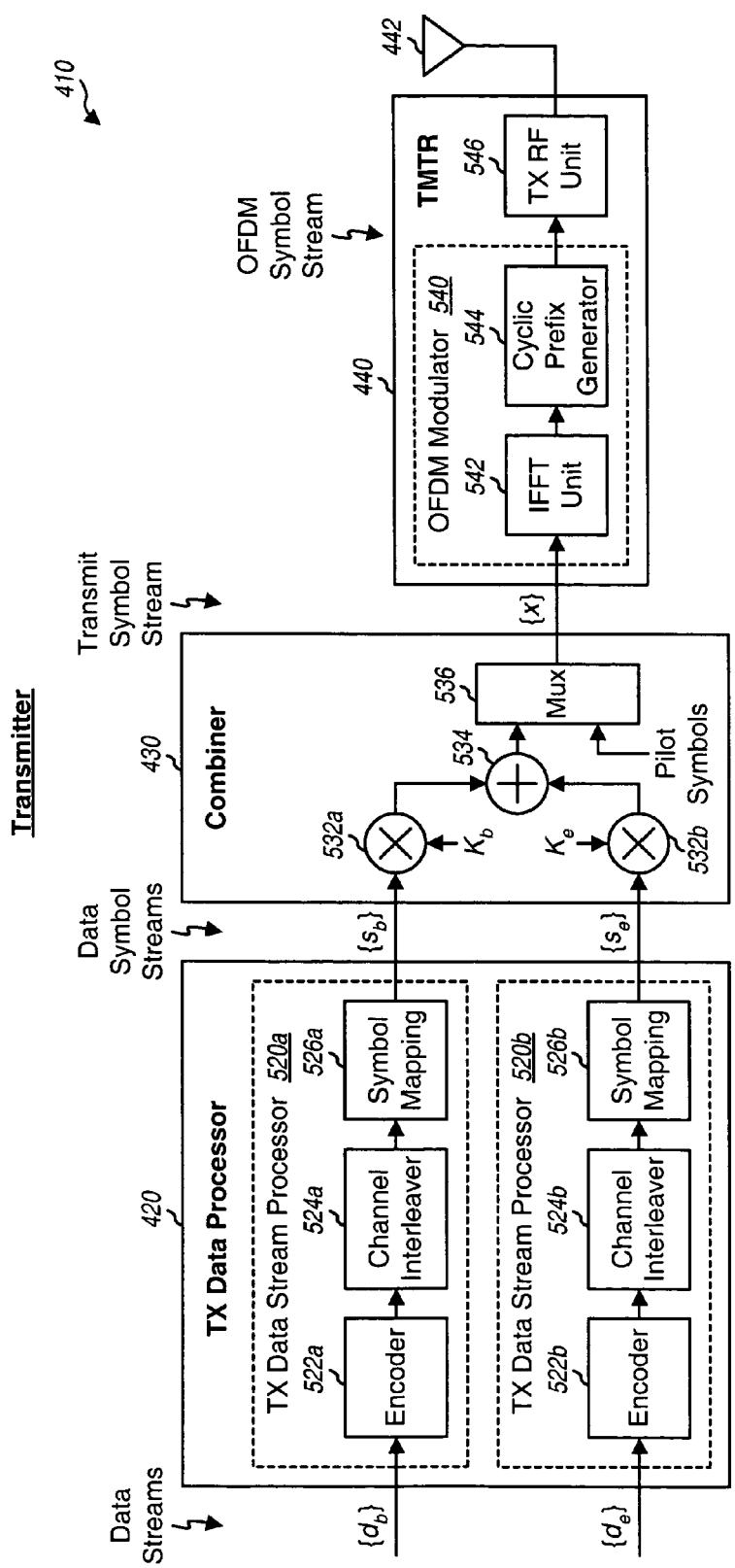
FIG. 5 shows various processing units at the transmitter.

FIG. 5 shows a block diagram of an embodiment of TX data processor 420, combiner 430, and transmitter unit 440 at transmitter 410.

TX data processor 420 includes two TX data stream processors 520a and 520b for the base stream and enhancement stream, respectively. Within TX data stream processor 520a, an encoder 522a receives and codes the base stream $\{d_b\}$ in accordance with a coding scheme and provides code bits. The encoding increases the reliability of the data transmission. The coding scheme may include a convolutional code, a Turbo code, a block code (e.g., a Reed-Solomon code), a CRC code, or a combination thereof. A channel interleaver 524a interleaves (i.e., reorders) the code bits from encoder 522a based on an interleaving scheme. The interleaving provides time and/or frequency diversity for the code bits. A symbol mapping unit 526a then modulates (i.e., symbol maps) the interleaved data from channel interleaver 524a in accordance with a modulation scheme and provides data symbols. The modulation may be achieved by (1) grouping sets of B interleaved bits to form B-bit binary values, where $B \geq 1$, and (2) mapping each B-bit binary value to a complex value for a point in a signal constellation for the modulation scheme. Symbol mapping unit 526a provides the stream of data symbols $\{s_b\}$, where each data symbol is a complex value. The encoding, channel interleaving, and symbol mapping may be performed separately for each data packet in the base stream. TX data stream processor 520b similarly processes the enhancement stream $\{d_e\}$ and provides the corresponding data symbol stream $\{s_e\}$. The coding, interleaving, and modulation schemes for the enhancement stream may be the same or different from those for the base stream.

Combiner 430 performs combining for hierarchical coding and multiplexes in pilot symbols. Within combiner 430, a multiplier 532a receives and multiplies the data symbol stream $\{s_b\}$ with a scaling factor $K_b$, and a multiplier 532b receives and multiplies the data symbol stream $\{s_e\}$ with a scaling factor $K_e$. The scaling factors $K_b$ and $K_e$ determine the amount of transmit power to use for the base stream and enhancement stream, respectively, and may be expressed as:

$$K_b = \sqrt{\alpha_p \cdot P_{total}}, \text{ and}$$

$$K_e = \sqrt{(1-\alpha_p) \cdot P_{total}}, \quad\quad\quad \text{Eq (18)}$$

where $P_{total}$ is the total transmit power available for the base and enhancement streams;
$\alpha_p$ is the fraction of the total transmit power to use for the base stream; and
$(1-\alpha_p)$ is the fraction of the total transmit power to use for the enhancement stream.

The amount of transmit power to allocate to each stream may be dependent on various factors such as the relative rates of the base stream and enhancement stream, the SINRs achieved by the users, the desired robustness for the two streams, the desired rates for these streams, and so on. A larger fraction of the total transmit power $P_{total}$ is typically allocated to the base stream.

For the embodiment shown in FIG. 5, a summer 534 receives and sums the scaled data symbols from multipliers 532a and 532b to obtain combined symbols, as follows:

$$x_d(k) = K_b \cdot s_b(k) + K_e \cdot s_e(k), \text{ for } k \in K_d, \quad\quad \text{Eq (19)}$$

where $x_d(k)$ is a combined symbol to be transmitted on subband k for the base stream and enhancement stream. Equation (19) explicitly shows the scaling of each data symbol to obtain the desired transmit power for the data symbol, whereas the equations above assume that the scaling is already reflected in the data symbol. The data symbols from processors 520a and 520b may also be combined in other manners. For example, a mapping unit may receive and map the data symbols (or the interleaved bits) for the two streams based on a mapping function and provide combined symbols. The mapping function may implement, for example, a linear function, a non-linear function, a function for a non-uniform modulation scheme (e.g., with the modulation scheme for the enhancement stream being superimposed on the modulation scheme for the base stream), or some other function.

A multiplexer (Mux) 536 receives and multiplexes the combined symbols with pilot symbols. The multiplexing is such that combined symbols are provided on the data subbands, pilot symbols are provided on the pilot subbands, and a signal value of zero (or a "zero symbol") is provided for each unused subband. Multiplexer 536 provides a transmit symbol stream $\{x\}$, where each transmit symbol may be a combined symbol $x_d(k)$, a pilot symbol $x_p(k)$, or a zero symbol.

Transmitter unit 440 performs OFDM modulation and signal conditioning to generate the modulated signal. Transmitter unit 440 includes an OFDM modulator 540 and a TX radio frequency (RF) unit 546. Within OFDM modulator 540, an inverse fast Fourier transform (IFFT) unit 542 receives the transmit symbol stream $\{x\}$ from combiner 430 and groups each set of N transmit symbols for the N subbands. IFFT unit 542 transforms each set of N transmit symbols to the time domain using an N-point inverse fast Fourier transform and provides a corresponding transformed symbol that contains N chips. A cyclic prefix generator 544 then repeats a portion of each transformed symbol to obtain a corresponding OFDM symbol that contains $N+N_{cp}$ chips. The repeated portion is referred to as a cyclic prefix, and $N_{cp}$ is the number of chips being repeated. The cyclic prefix ensures that the OFDM symbol retains its orthogonal properties in the presence of multipath delay spread caused by frequency selective fading (i.e., a frequency response that is not flat). Cyclic prefix generator 544 provides a stream of OFDM symbols. TX RF unit 546 receives and conditions (e.g., converts to analog, frequency upconverts, filters, and amplifies) the OFDM symbol stream and generates the modulated signal, which is transmitted from antenna 442.

Figure 6:
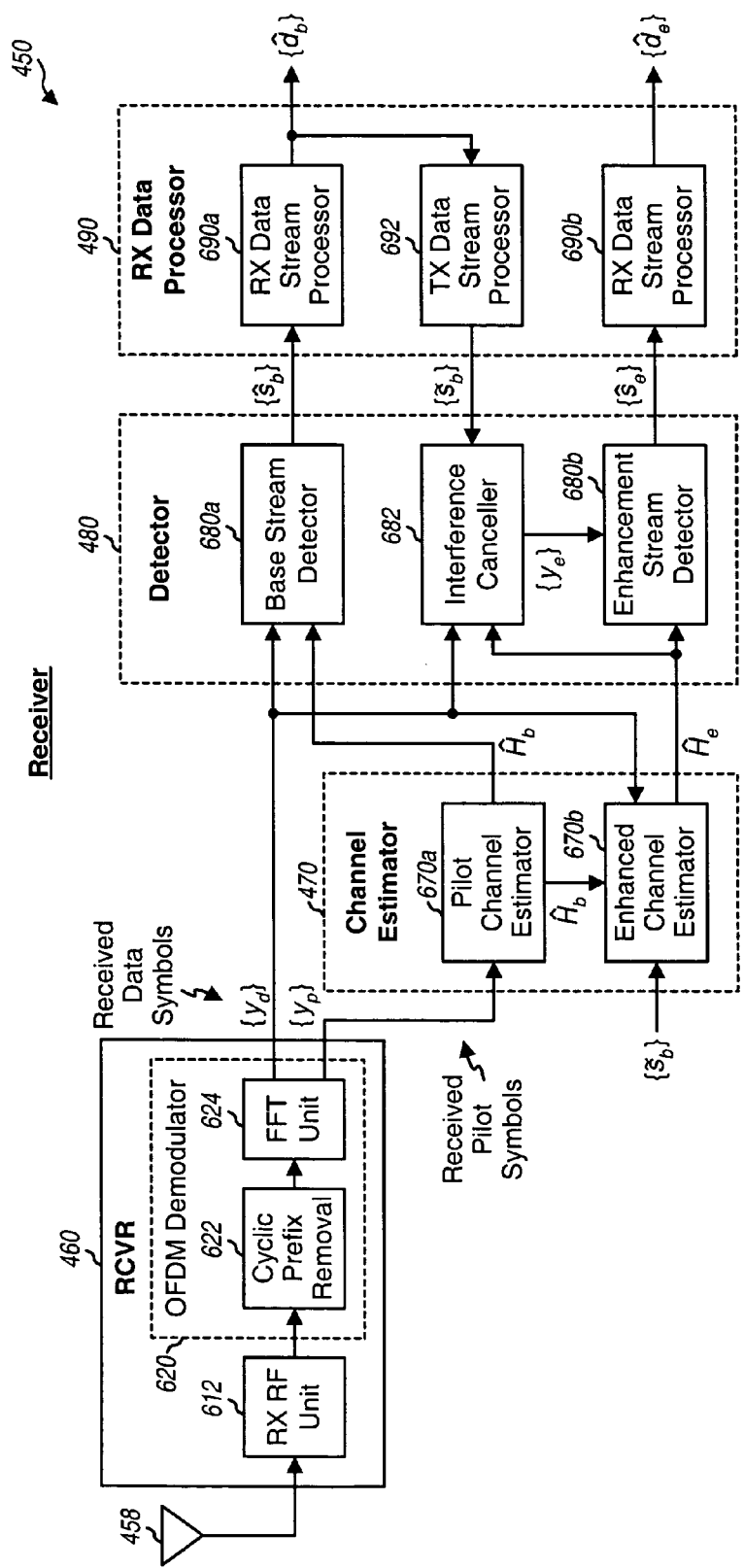
FIG. 6 shows various processing units at the receiver.

FIG. 6 shows a block diagram of an embodiment of receiver unit 460, channel estimator 470, detector 480, and RX data processor 490 at receiver 450. Receiver unit 460 includes an RX RF unit 612 and an OFDM demodulator 620. RX RF unit 612 receives, conditions, and digitizes the received signal from antenna 458 and provides a stream of samples to OFDM demodulator 620. Within OFDM demodulator 620, a cyclic prefix removal unit 622 removes the cyclic prefix in each received OFDM symbol and provides a corresponding received transformed symbol. A fast Fourier transform (FFT) unit 624 then transforms each received transformed symbol to the frequency domain with an N-point fast Fourier transform to obtain N received symbols for the N subbands. OFDM demodulator 620 provides received data symbols $\{y_d\}$ for the data subbands to channel estimator 470 and detector 480 and further provides received pilot symbols $\{y_p\}$ for the pilot subbands to channel estimator 470.

Channel estimator 470, detector 480, and RX data processor 490 implement two cascaded receiver processing stages for the two data streams to be recovered. Stage 1 recovers the base stream and includes a pilot channel estimator 670a, a base stream detector 680a, and an RX data stream processor 690a. Stage 2 recovers the enhancement stream and includes an enhanced channel estimator 670b, an interference canceller 682, a TX data stream processor 692, an enhancement stream detector 680b, and an RX data stream processor 690b. The receiver structure shown in FIG. 6 may be extended to any number of stages for any number of data streams, with each subsequent stage including the same processing units as for stage 2.

For stage 1, channel estimator 670a derives the channel estimate $\hat{H}_b$ based on the received pilot symbols $\{y_p\}$ and provides the channel estimate $\hat{H}_b$ to channel estimator 670b and detector 680a. Channel estimator 670a may implement the least-squares channel estimation technique described above in equations (10) through (13) or some other channel estimation technique. Detector 680a performs detection on the received data symbols $\{y_d\}$ using the channel estimate $\hat{H}_b$ and provides detected symbols $\{\hat{s}_b\}$ for the base stream. RX data stream processor 690a demodulates, deinterleaves, and decodes the detected symbols $\{\hat{s}_b\}$ to obtain the decoded base stream $\{\hat{d}_b\}$. RX data stream processor 690a includes a symbol demapping unit, a deinterleaver, and a decoder (not shown in FIG. 6) that perform the complementary processing as TX data stream processor 520a in FIG. 5.

For stage 2, TX data stream processor 692 encodes, interleaves, and modulates the decoded base stream $\{\hat{d}_b\}$ to obtain remodulated symbols $\{\tilde{s}_b\}$ for the base stream, which are provided to channel estimator 670b and interference canceller 682. TX data stream processor 692 performs the same processing as TX data stream processor 520a. Channel estimator 670b derives the data-directed channel estimate $\hat{H}_{rb}$ based on the received data symbols $\{y_d\}$ and the remodulated symbols $\{\tilde{s}_b\}$, e.g., as shown in equation (4). Channel estimator 670b further combines the channel estimates $\hat{H}_b$ and $\hat{H}_{rb}$ (e.g., using any of the techniques described above) to obtain the enhanced channel estimate $\hat{H}_e$, which is provided to interference canceller 682 and detector 680b. Interference canceller 682 estimates the interference due to the base stream using the channel estimate $\hat{H}_e$. Interference canceller 682 further cancels the estimated interference from the received data symbols $\{y_d\}$, as shown in equation (7), and provides interference-canceled symbols $\{y_e\}$ to detector 680b. Detector 680b performs detection on the interference-canceled symbols $\{y_e\}$ using the channel estimate $\hat{H}_e$ and provides detected symbols $\{\hat{s}_e\}$ for the enhancement stream. RX data stream processor 690b demodulates, deinterleaves, and decodes the detected symbols $\{\hat{s}_e\}$ to obtain the decoded enhancement stream $\{\hat{d}_e\}$.

For the embodiments described above, the data-directed channel estimate $\hat{H}_{rb}$ is derived from the remodulated symbols $\{\tilde{s}_b\}$ for the base stream. The remodulated symbols are of higher quality than the received data symbols because they are obtained after the decoding at the receiver and benefit from the error correction capability of the coding scheme. Moreover, the channel estimate $\hat{H}_{rb}$ may be derived only if the base stream is decoded correctly. In this case, the remodulated symbols $\{\tilde{s}_b\}$ can be considered to be free of errors, and the channel estimate $\hat{H}_{rb}$ is robust against decision errors.

The channel estimate $\hat{H}_{rb}$ may also be derived from the detected symbols $\{\hat{s}_b\}$ for the base stream. A symbol demapping unit can map the detected symbols $\{\hat{s}_b\}$ to the nearest modulation symbols based on the modulation scheme used for the base stream. The symbol demapping unit would then provide hard-decision or demodulated symbols $\{\check{s}_b\}$, which can be used in place of the remodulated symbols $\{\tilde{s}_b\}$ to derive the channel estimate $\hat{H}_{rb}$. Since the decoding for the base stream takes some time, the receiver can derive the channel estimate $\hat{H}_{rb}$ with shorter delay using the demodulated symbols $\{\check{s}_b\}$. However, the demodulated symbols do not benefit from the error correcting capability of the coding scheme and are less reliable than the remodulated symbols. Thus, the channel estimate obtained with the demodulated symbols has lower quality.

The transmitter typically codes each data packet in each data stream and provides a codeword for each data packet. The receiver typically waits until an entire codeword has been received before decoding the codeword. To minimize processing delay, the codeword size can be selected to span a small number of OFDM symbols. For example, if each codeword spans one OFDM symbol, then the receiver can decode each codeword as soon as it is provided by FFT unit 624 and would not need to wait multiple OFDM symbols until the entire codeword is received.

For clarity, the channel estimation and data processing techniques have been specifically described for an OFDM-based system with hierarchical coding. In general, these techniques may be used for various wireless systems that transmit multiple data streams simultaneously and which may or may not perform interference cancellation. For such a system, each decoded data stream can be used to improve the channel estimate. Depending on the system, the enhanced channel estimate may be used for estimating and canceling the interference due to the decoded data stream and/or for detecting another data stream. In effect, the remodulated symbols $\{\tilde{s}_b\}$ (or the demodulated symbols $\{\check{s}_b\}$) for each decoded data stream may be used as additional pilot symbols to improve the quality of the channel estimate. The cancellation of the decoded data stream and the detection of the next data stream may both be improved with the higher quality channel estimate. These techniques are especially beneficial for a hierarchical coded system because (1) the base stream and enhancement stream are transmitted via the same wireless channel and (2) the base stream typically has more power than the enhancement stream and the data-directed channel estimate $\hat{H}_{rb}$ observes less interference from the enhancement stream.

The techniques described herein may also be used for a single-carrier system without OFDM. In this case, the channel estimation is performed for one subband. For a wideband single-carrier system, various techniques known in the art may be used to account for frequency selectivity in the wideband channel.

The channel estimation and data processing techniques may also be used for a multiple-input multiple-output (MIMO) system. In the MIMO system, the transmitter can simultaneously transmit multiple (L) data streams from multiple (T) antennas, and the receiver can receive the transmitted streams with multiple (R) antennas, where $R \geq T$. The receiver can derive an R×T channel response matrix $\underline{\hat{H}}_b$ based on received pilot symbols, perform receiver spatial processing (which is detection for a MIMO system) on R received symbol streams using the matrix $\underline{\hat{H}}_b$ to obtain L detected symbol streams, and decode one of the detected symbol streams (e.g., stream $\{\hat{s}_l\}$). The receiver can then derive an R×T channel response matrix $\hat{\underline{H}}_b$ based on remodulated symbols for the decoded data stream $\{\hat{d}_i\}$. The matrix $\hat{\underline{H}}_{rb}$ would contain a column of channel gain estimates for each antenna used to transmit data stream $\{d_i\}$. The receiver can combine the matrices $\hat{\underline{H}}_b$ and $\hat{\underline{H}}_{rb}$ to obtain an enhanced channel response matrix $\hat{\underline{H}}_e$. The receiver can then use the matrix $\hat{\underline{H}}_e$ to estimate and cancel the interference due to data stream $\{d_i\}$ and to perform receiver spatial processing for another data stream.

When recovering the first symbol stream in the MIMO system, it is not necessary to detect for all L symbol streams or to know the channel estimates for the other L-1 symbol streams not being recovered. The channel estimation and data processing techniques may be used so long as there is some relation between the channel for the first stream and the channels for the other streams.

The channel estimation and data processing techniques may also be used for a MIMO system that utilizes OFDM (i.e., a MIMO-OFDM system). In the MIMO-OFDM system, the transmitter can simultaneously transmit multiple data streams on multiple subbands of multiple antennas. The receiver can derive an R×T channel response matrix $\hat{\underline{H}}_b(k)$ for each pertinent subband (e.g., each subband, each data subband, or each usable subband) based on received pilot symbols. The receiver can further derive an R×T channel response matrix $\hat{\underline{H}}_{rb}(k)$ for each pertinent subband based on remodulated symbols for a decoded data stream $\{\hat{d}_i\}$. The matrices $\hat{\underline{H}}_{rb}(k)$ for all pertinent subbands would contain a channel gain estimate for each subband of each antenna used to transmit data stream $\{d_i\}$. The receiver can combine the matrices $\hat{\underline{H}}_b(k)$ and $\hat{\underline{H}}_{rb}(k)$ for each pertinent subband to obtain an enhanced channel response matrix $\hat{\underline{H}}_e(k)$ for that subband. The receiver can then use the matrices $\hat{\underline{H}}_e(k)$ for all pertinent subbands to estimate and cancel the interference due to data stream $\{d_i\}$ and to perform receiver spatial processing for another data stream. When recovering each symbol stream in the MIMO-OFDM system, it is not necessary to decode the remaining streams or even know the channel estimates for these streams in order to use the channel estimation and data processing techniques described herein. One exemplary scheme for transmitting multiple data streams in a MIMO-OFDM system is described in commonly assigned U.S. patent application Ser. No. 10/619,703, entitled "Transmission Scheme for Multi-Carrier MIMO Systems," filed Dec. 8, 2003.

The channel estimation and data processing techniques described herein can be used for the downlink as well as the uplink in a wireless communication system. The downlink refers to the communication link from a base station to a user terminal, and the uplink refers to the communication link from the user terminal to the base station.

The channel estimation and data processing techniques described herein may be implemented by various means. For example, these techniques may be implemented in hardware, software, or a combination thereof. For a hardware implementation, the processing units used to perform the channel estimation and data processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the channel estimation and data processing techniques may be implemented with modules (e.g., procedures, functions, and so on) that perform the functions described herein. The software codes may be stored in a memory unit (e.g., memory unit 454 in FIG. 4) and executed by a processor (e.g., controller 452). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of recovering first and second data streams transmitted simultaneously via a wireless channel in a wireless communication system, comprising:
    deriving a first channel estimate for the wireless channel based on received symbols;
    performing detection for the first data stream using the first channel estimate;
    deriving a second channel estimate based on the detected first data stream;
    deriving a third channel estimate based on the first and second channel estimates; and
    performing detection for the second data stream using the third channel estimate, wherein the second data stream is an enhancement stream of the first data stream.

2. The method of claim 1, wherein the first channel estimate for the wireless channel is derived based on received pilot symbols.

3. The method of claim 1, further comprising:
    estimating interference due to the first data stream using the third channel estimate, and wherein the detection for the second data stream is performed with the estimated interference from the first data stream canceled.

4. The method of claim 3, wherein the first and second data streams are combined prior to transmission via the wireless channel.

5. The method of claim 1, wherein the deriving a first channel estimate includes
    obtaining a frequency response estimate for the wireless channel based on the received pilot symbols,
    deriving a time-domain impulse response estimate for the wireless channel based on the frequency response estimate, and
    deriving the first channel estimate based on the time-domain impulse response estimate.

6. The method of claim 5, wherein the time-domain impulse response estimate is derived by performing an inverse fast Fourier transform (IFFT) on the frequency response estimate, and wherein the first channel estimate is derived by performing a fast Fourier transform (FFT) on the time-domain impulse response estimate.

7. The method of claim 1, wherein the deriving a second channel estimate includes
    obtaining a frequency response estimate for the wireless channel based on the detected first data stream,
    deriving a time-domain impulse response estimate for the wireless channel based on the frequency response estimate, and
    deriving the second channel estimate based on the time-domain impulse response estimate.

8. The method of claim 1, wherein the first and second channel estimates are time-domain impulse response estimates, and wherein the third channel estimate is a frequency response estimate derived by combining and transforming the time-domain impulse response estimates for the first and second channel estimates.

9. The method of claim 1, wherein the first channel estimate comprises channel gain estimates for a first group of subbands and the second channel estimate comprises channel gain estimates for a second group of subbands, and wherein the third channel estimate is derived based on a concatenation of the channel gain estimates for the first and second groups of subbands.

10. The method of claim 9, wherein the third channel estimate is derived by frequency interpolation of the channel gain estimates for the first and second groups of subbands.

11. The method of claim 9, wherein the first group of subbands is used for pilot transmission and the second group of subbands is used for data transmission.

12. The method of claim 1, wherein the detection for the first data stream is performed on received data symbols and provides detected symbols for the first data stream.

13. The method of claim 12, further comprising:
decoding the detected symbols for the first data stream to obtain decoded data for the first data stream; and
re-encoding the decoded data to obtain remodulated symbols for the first data stream, and wherein the second channel estimate is derived based on the remodulated symbols and the received data symbols.

14. The method of claim 12, further comprising:
mapping the detected symbols for the first data stream to modulation symbols based on a modulation scheme used for the first data stream, and wherein the second channel estimate is derived based on the modulation symbols and the received data symbols.

15. The method of claim 1, wherein the deriving a third channel estimate includes
scaling the first channel estimate with a first scaling factor,
scaling the second channel estimate with a second scaling factor, and
combining the scaled first channel estimate and the scaled second channel estimate to obtain the third channel estimate.

16. The method of claim 15, wherein the first and second scaling factors are selected based on reliability of the first channel estimate relative to reliability of the second channel estimate.

17. The method of claim 1, further comprising:
filtering the first channel estimate, and wherein the third channel estimate is derived based on the filtered first channel estimate.

18. The method of claim 1, further comprising:
filtering the second channel estimate, and wherein the third channel estimate is derived based on the filtered second channel estimate.

19. The method of claim 1, further comprising:
filtering the third channel estimate, and wherein the detection for the second data stream is performed using the filtered third channel estimate.

20. The method of claim 1, further comprising:
filtering the first, second, or third channel estimate in time domain or frequency domain.

21. The method of claim 20, wherein the filtering is performed with an infinite impulse response (IIR) filter.

22. The method of claim 20, wherein the filtering is performed with a finite impulse response (FIR) filter.

23. The method of claim 1, wherein the wireless communication system utilizes orthogonal frequency division multiplexing (OFDM).

24. The method of claim 23, wherein the received pilot symbols are obtained in each OFDM symbol period and for a set of subbands used for pilot transmission.

25. The method of claim 23, wherein the received pilot symbols are obtained for OFDM symbol periods used for pilot transmission, wherein the first channel estimate is derived for each OFDM symbol period used for pilot transmission, and wherein the second channel estimate is derived for each OFDM symbol period used for data transmission.

26. The method of claim 1, wherein the wireless communication system is a multiple-input multiple-output (MIMO) communication system, and wherein the first and second data streams are transmitted simultaneously from a plurality of antennas.

27. An apparatus operable to recover first and second data streams transmitted simultaneously via a wireless channel in a wireless communication system, comprising:
a channel estimator operative to derive a first channel estimate for the wireless channel based on received symbols, derive a second channel estimate based on detected symbols for the first data stream, and derive a third channel estimate based on the first and second channel estimates; and
a detector operative to perform detection for the first data stream using the first channel estimate, provide the detected symbols for the first data stream, perform detection for the second data stream using the third channel estimate, and provide detected symbols for the second data stream, wherein the second data stream is an enhancement stream of the first data stream.

28. The apparatus of claim 27, wherein the detector is further operative to estimate interference due to the first data stream using the third channel estimate and to perform detection for the second data stream with the estimated interference from the first data stream canceled.

29. The apparatus of claim 27, further comprising:
a receive data processor operative to decode the detected symbols for the first data stream to obtain decoded data for the first data stream and to re-encode the decoded data to obtain remodulated symbols for the first data stream, and wherein the channel estimator is operative to derive the second channel estimate based on the remodulated symbols and received data symbols.

30. An apparatus operable to recover first and second data streams-transmitted simultaneously via a wireless channel in a wireless communication system, comprising:
means for deriving a first channel estimate for the wireless channel based on received symbols;
means for performing detection for the first data stream using the first channel estimate;
means for deriving a second channel estimate based on the detected first data stream;
means for deriving a third channel estimate based on the first and second channel estimates; and
means for performing detection for the second data stream using the third channel estimate, wherein the second data stream in an enhancement stream of the first data stream.

31. The apparatus of claim 30, further comprising:
means, for estimating interference due to the first data stream using the third channel estimate, and wherein the detection for the second data stream is performed with the estimated interference from the first data stream canceled.

32. The apparatus of claim 30, further comprising:
means for decoding detected symbols for the first data stream to obtain decoded data for the first data stream, and
means for re-encoding the decoded data to obtain remodulated symbols for the first data stream, and wherein the second channel estimate is derived based on the remodulated symbols and received data symbols.

33. A method of recovering a base stream and an enhancement stream of the base stream transmitted simultaneously via a wireless channel in a wireless communication system, comprising:
deriving a first channel estimate for the wireless channel based on received pilot symbols;
performing detection for the base stream using the first channel estimate to obtain detected symbols for the base stream,
decoding the detected symbols for the base stream to obtain decoded data for the base stream;
re-encoding the decoded data for the base stream to obtain remodulated symbols for the base stream;
deriving a second channel estimate based on the remodulated symbols;
deriving a third channel estimate based on the first and second channel estimates;
estimating interference due to the base stream using the third channel estimate;
performing detection for the enhancement stream, with the estimated interference from the base stream canceled and using the third channel estimate, to obtain detected symbols for the enhancement stream; and
decoding the detected symbols for the enhancement stream to obtain decoded data for the enhancement stream.

34. The method of claim 33, wherein the deriving a first channel estimate includes
obtaining a frequency response estimate for the wireless channel based on the received pilot symbols,
deriving an impulse response estimate for the wireless channel based on the frequency response estimate, and
deriving the first channel estimate based on the impulse response estimate.

35. A computer-readable medium storing instructions thereon for recovering first and second data streams transmitted simultaneously via a wireless channel in a wireless communication system, the computer-readable medium comprising:
code for causing a computer to derive a first channel estimate for the wireless channel based on received symbols;
code for causing a computer to perform detection for the first data stream using the first channel estimate;
code for causing a computer to derive a second channel estimate based on the detected first data stream;
code for causing a computer to derive a third channel estimate based on the first and second channel estimates; and
code for causing a computer to perform detection for the second data stream using the third channel estimate, wherein the second data stream is an enhancement stream of the first data stream.

36. A processor configured to execute instructions for recovering first and second data streams transmitted simultaneously via a wireless channel in a wireless communication system, wherein the processor executing the instructions is operable to:
derive a first channel estimate for the wireless channel based on received symbols;
perform detection for the first data stream using the first channel estimate;
instructions to derive a second channel estimate based on the detected first data stream;
derive a third channel estimate based on the first and second channel estimates; and
perform detection for the second data stream using the third channel estimate, wherein the second data stream is an enhancement stream of the first data stream.

* * * * *